United States Patent
Azanza Ladrón et al.

(10) Patent No.: US 12,293,006 B2
(45) Date of Patent: May 6, 2025

(54) ELECTRONIC SIGNATURES

(71) Applicant: VERIDAS DIGITAL AUTHENTICATION SOLUTIONS, S.L., Tajonar (ES)

(72) Inventors: Eduardo Azanza Ladrón, Gorraiz (ES); Miguel Ángel Sánchez Yoldi, Tajonar (ES); Francisco Julián Zamora Martínez, Tajonar (ES); Jose Luis González De Suso Molinero, Tajonar (ES); Leire Arbona Puértolas, Tajonar (ES)

(73) Assignee: VERIDAS DIGITAL AUTHENTICATION SOLUTIONS, S.L., Tajonar (ES)

( * ) Notice: Subject to any disclaimer, the term of this patent is extended or adjusted under 35 U.S.C. 154(b) by 402 days.

(21) Appl. No.: 17/796,894

(22) PCT Filed: Mar. 18, 2020

(86) PCT No.: PCT/EP2020/057422
§ 371 (c)(1),
(2) Date: Aug. 2, 2022

(87) PCT Pub. No.: WO2021/155961
PCT Pub. Date: Aug. 12, 2021

(65) Prior Publication Data
US 2023/0054629 A1    Feb. 23, 2023

(30) Foreign Application Priority Data

Feb. 7, 2020 (EP) .................................. 20382083

(51) Int. Cl.
*G06F 21/64* (2013.01)
*G06F 21/32* (2013.01)

(52) U.S. Cl.
CPC .............. *G06F 21/64* (2013.01); *G06F 21/32* (2013.01)

(58) Field of Classification Search
CPC .......... G06F 21/64; G06F 21/32; G06F 21/36; H04L 9/0866
See application file for complete search history.

(56) References Cited

U.S. PATENT DOCUMENTS 11,811,937 B2 *  11/2023  Rhodin ............... H04L 63/0861
11,917,074 B2 *   2/2024  Hong .................... H04L 9/0894
(Continued)

FOREIGN PATENT DOCUMENTS

| EP | 2911067 A1 | 8/2015 |
| EP | 3355224 A1 | 8/2018 |
| WO | WO 2017/100929 A1 | 6/2017 |

OTHER PUBLICATIONS

International Search Report and Written Opinion mailed Oct. 13, 2020 for Application No. PCT/EP2020/057422; 15 pages.

*Primary Examiner* — Chau Le
(74) *Attorney, Agent, or Firm* — SQUIRE PATTON BOGGS (US) LLP (57) ABSTRACT

Methods are provided for generating an electronic signature, for authenticating said electronic signature, for authenticating integrity of a content signed with said electronic signature, and for authenticating an identity of a signatory who signed said electronic signature, along with systems, computer systems and computer programs suitable for performing said methods. Said methods for generating an electronic signature comprise: receiving a first physical characteristic representative of a person, the first physical characteristic containing a first biometric feature of the person; identifying the first biometric feature in the received first physical characteristic; generating a first biometric mathematical representation representing the first biometric feature of the
(Continued)

person; receiving a content to be signed; generating a first content mathematical representation representing the content to be signed; storing the first biometric mathematical representation and the first content mathematical representation in a signature dataset; and computing a first signature mathematical representation of the signature dataset.

19 Claims, 7 Drawing Sheets

(56) References Cited

U.S. PATENT DOCUMENTS

| | | | |
|---|---|---|---|
| 2018/0212782 A1* | 7/2018 | Csik | G06F 21/64 |
| 2019/0197815 A1* | 6/2019 | Kamal | H04L 63/0861 |
| 2020/0042773 A1* | 2/2020 | Benkreira | G06V 20/62 |
| 2020/0145219 A1* | 5/2020 | Sebastian | H04L 9/50 |

* cited by examiner

ELECTRONIC SIGNATURES

CROSS-REFERENCE TO RELATED APPLICATIONS

This application is a national-stage filing under 35 USC 371 (c) of International Application No. PCT/EP2020/057422, filed Mar. 18, 2020, which claims the benefit of European Patent Application EP20382083 filed on Feb. 7, 2020. The entire contents of these applications are incorporated by reference herein in their entirety for all purposes.

This application claims the benefit of European Patent Application EP20382083 filed on Feb. 7, 2020.

The present disclosure relates to methods and devices for generating electronic signatures. The present disclosure further relates to methods and devices for authenticating the electronic signature, the integrity of a signed content, and the identity of a signatory.

BACKGROUND

It is well known the use of the so-called electronic signatures or e-signatures as security tools in sensitive operations performed through a digital environment such as the Internet. These operations may be any which are sensitive in terms of accessed information, the operation itself and confidentiality. By way of example, opening a bank account may be a sensitive operation.

Apart from the security risks related to the digital environment, these operations may be even more sensitive when they are performed by means of portable electronic devices such as mobile phones, tablets, laptops, etc. Using portable devices can increase the risk of data loss, data exposure, and increased exposure to network-based attacks to and from any system the device is connected to.

Furthermore, fraudsters are continuously developing new types of fraud to access personal data from the Internet and supplanting identities which may be illegally used in sensitive operations.

Some regulations have been implemented in order to enhance the security in the sensitive operations. For example, the EU Regulation 910/2014 on electronic identification, commonly known as eIDAS which stands for Electronic Identification, Authentication and Trust Services. This EU regulation introduces requirements to be met by an electronic signature to be considered as an "Advanced electronic signature". An electronic signature is considered advanced if it meets certain requirements:

It is uniquely linked to the signatory;
It is capable of identifying the signatory;
It is created using electronic signature creation data that the signatory can, with a high level of confidence, use under his sole control; and
It is linked to the data signed therewith in such a way that any subsequent change in the data is detectable.

Moreover, electronic signature regulations commonly distinguish between "identification" (signatory's identity validation) and "authentication" (related to the integrity of the content to be signed or content already signed). Conventional electronic signatures, even those considered "Advance electronic signatures" or "Qualified electronic signatures" for example under eIDAS Regulation, mainly focus on the "authentication" presuming the correct "identification" merely because the user holds a document or certificate or knows certain data. Such a presumption of the identity may mean a security issue.

As sensitive operations in digital environments become even more common and usual, there is a need for further improvements in electronic signatures. The present disclosure aims to provide methods and systems related to electronic signatures that avoid or at least reduce drawbacks of the prior art solutions.

SUMMARY

In a first aspect, a method for generating an electronic signature is provided. The method comprises receiving at least one first physical characteristic representative of a person, the first physical characteristic containing a first biometric feature of the person. The method further comprises identifying the first biometric feature in the received first physical characteristic, generating a first biometric mathematical representation representing the first biometric feature of the person, receiving a content to be signed, generating a first content mathematical representation representing the content to be signed, storing the first biometric mathematical representation and the first content mathematical representation in a signature dataset, and computing a first signature mathematical representation of the signature dataset.

As the biometric mathematical representation of the person is stored in the signature dataset, the dataset may be uniquely linked to a signatory, i.e. the person whose physical characteristic is used to generate the biometric mathematical representation. Therefore, the signatory may be duly identified, i.e. with certainty.

The signature dataset comprises the first content mathematical representation representing the content to be signed, so an authentication related to the integrity of the content to be signed or already signed may be carried out. If the signature dataset is modified, the first signature mathematical representation will do as well. Any subsequent change in the signature dataset, and thus the signature mathematical representation may be detectable.

Thus, the method of this first aspect may allow equal compliance with both requirements of "identification" and "authentication". Therefore, with the methods and systems herein disclosed, identification may go from presumption to certainty in an electronic signature.

Thus, the method according to this first aspect may provide an enhanced security to sensitive online operations.

A biometric mathematical representation may be, for instance, a biometric vector or a biometric matrix. A biometric vector may be a numerical string extracted from a biometric feature (e.g. facial image or voice recording). The numerical string may be extracted through a biometric engine.

A signature dataset of the present disclosure may be used/considered as an electronic signature. The first signature mathematical representation may be used/considered as an electronic signature as well.

Thanks to the first aspect, the first content mathematical representation and the first biometric mathematical representation of the signatory may be linked with each other. This may avoid future rejections in the ownership of a right or an obligation. By using biometrics in the creation of an electronic signature, the rights of all the stakeholders involved in the operation may be more protected than with the previous state of the art in this field.

A content mathematical representation may be, for instance, a content vector or a content matrix. The content vector or the content matrix may be digital data representing a content to be signed or a signed content as herein defined.

A content vector may be a numerical string extracted from the content. The numerical string may be extracted through suitable computer algorithms.

The "signature mathematical representation" may refer to any mathematical functions that may allow joining together the biometric part (such as the first biometric mathematical representation) and the content part (such as the first content mathematical representation). The mathematical function may comprise a hash function or the like that may produce a hash value based on the data of the biometric part and the content part. The mathematical function may also produce the content substantially without a change with respect the fed content, for example the mathematical function may also produce the same content as fed. An example of the latter may be taking bits of a series of data related to the content and passing them through a mathematical function that multiplies them by 1. This may produce the same data as a result substantially without any variation. Therefore, in some cases the first signature mathematical representation may be the same as the signature dataset. The signature dataset may be delivered as such.

According to an example of this aspect, the method may further comprise authenticating the identity of the person intended to sign. This way, the signatory may be identified before the signature dataset is provided. The method according to this example may surpass previous electronic signatures and its multiple evidences regarding proof of identity offer a robustness and evidentiary assurance that may improve operations, actions or transactions conducted digitally and even in person. The previous may have evidentiary effects in court, as it may comply with the necessary security conditions in order to be used as evidence and avoid doubts in a trial concerning the authenticity of the signatory or the integrity of the ID document.

According to one example, the method of the first aspect may further comprise receiving a time stamp of the signature dataset (and thus the first signature mathematical representation). The time stamp may certainly provide the person intended to sign or already signatory with the exact time at which the signature data has been generated.

A method for authenticating the electronic signature generated by the method of generating an electronic signature according to any of herein disclosed examples, is also disclosed. The method for authenticating the electronic signature may comprise: obtaining the first signature mathematical representation of the signature dataset, obtaining the signature dataset, computing a second signature mathematical representation of the obtained signature dataset, and authenticating the electronic signature if the first signature mathematical representation and the second signature mathematical representation are equal.

A method for authenticating the integrity of a signed content signed with an electronic signature generated by the method according to any of herein disclosed examples, is disclosed. The method for authenticating the integrity may comprise obtaining the first content mathematical representation stored in the signature dataset, computing a second content mathematical representation of the signed content, and authenticating the integrity of the signed content if the first content mathematical representation and the second content mathematical representation are equal.

A method for authenticating an identity of the signatory who signed the electronic signature generated by the method of generating an electronic signature according to any of herein disclosed examples, is disclosed. The method for authenticating the identity may comprise receiving the first biometric mathematical representation stored on the signature dataset. The method may further comprise receiving a second physical characteristic representative of a person, the second physical characteristic containing a second biometric feature of the person, identifying the second biometric feature in the received second physical characteristic, generating a second biometric mathematical representation representing the identified second biometric feature, determining a fourth matching score by comparing the first biometric mathematical representation and the second biometric mathematical representation, and authenticating the identity of the signatory if the determined fourth matching score satisfies a predefined threshold.

In one example, the method for authenticating an identity of the signatory may further comprise authorizing access to full content of the data stored on the signature dataset or to full content of the signed content. This feature may be used as kind of password. According to some examples, the method for authenticating an identity of the signatory may further comprise authorizing access to partial content of the data stored on the signature dataset or to partial content of the signed content. This feature may be used as a kind of password. The data of the electronic signature, the user's biometrics and the content to be signed may remain private and may only be disclosed under certain circumstances. Therefore, the method according to any of both examples may provide an enhancement in terms of privacy and data protection.

Moreover, the methods for generating, and even authenticating an electronic signature described in the present disclosure may allow to join the digital and physical environments. An electronic signature dataset generated using biometrics in accordance with the present disclosure may be presented in an electronic device as well as a physical medium with substantially equal level of assurance. For example, the electronic signature described in the present disclosure could be printed in a traditional contract (i.e. using a machine-readable optical label). Such electronic signature and the identity of the signatory could be further authenticated for both scenarios, digital and physical.

In another aspect, a non-transitory computer program product is disclosed. The computer program product may comprise program instructions for causing a computing system to perform a method of generating an electronic signature according to some examples disclosed herein.

The computer program product may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the processes. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant methods.

In a still further aspect, a computing device comprising a memory and a processor, embodying instructions stored in the memory and executable by the processor, the instructions comprising functionality to execute a method according to any of herein disclosed examples.

In a yet further aspect, a system is provided for generating an electronic signature. This system comprises a characteristic receiving module, an identifying module, a biometric generating module, a content receiving module, a content generating module, a storing module and a computing module.

The characteristic receiving module is configured to receive at least one first physical characteristic representative of a person, the first physical characteristic containing a first biometric feature of the person. The identifying module is configured to identify the first biometric feature in the received physical characteristic. The biometric generating module is configured to generate a first biometric mathematical representation representing the first biometric feature of the person. The content receiving module is configured to receive a content to be signed. The content generating module is configured to generate a first content mathematical representation of the content to be signed. The storing module is configured to store the first biometric mathematical representation and the first content mathematical representation in a signature dataset. The computing module is configured to compute a first signature mathematical representation of the signature dataset.

Since this system for generating an electronic signature may be suitable for performing the above methods for generating an electronic signature, same or similar principles and advantages as those commented with respect to said methods may be attributed to such generation systems.

Throughout the present disclosure, a dataset may be understood as a set of data, a computer file or the like.

Throughout the present disclosure, content to be signed may be understood as data related to subject matter to be signed. The subject matter may be digitally or physically embodied such as a document, a contract, an arrangement, an agreement, a report, a memorandum, a communication, a letter, a file or the like.

Throughout the present disclosure, signed content or content already signed may be understood as data that has been signed, i.e. data linked to a generated signature dataset. The subject matter may be the same as defined above for the content to be signed.

Throughout the present disclosure, biometrics may refer to metrics related to human body characteristics.

Throughout the present disclosure, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the described particular module.

Moreover, the modules may be implemented across multiple devices (associated or linked to the system for generating an electronic signature) and/or other components that may be local or remote to one another. Additionally, the modules may be moved from one device and added to another device, and/or may be included in both devices (associated to the system for generating an electronic signature). Any software implementations may be tangibly embodied in one or more storage media, such as e.g. a memory device, a floppy disk, a compact disk (CD), a digital versatile disk (DVD), or other devices that may store computer code.

The present disclosure is not exclusively linked to the implementation of the European Regulation eIDAS. The disclosure may be applied in any suitable scenario where an electronic signature may be required, implemented, used and so on.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 7:
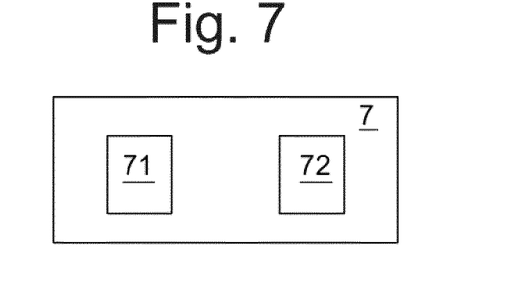
FIG. 7 schematically illustrates a block related to an example of a signature dataset.
Figure 8:
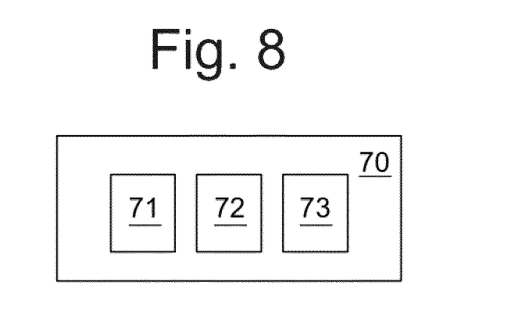
FIG. 8 schematically illustrates a block related to a further example of a signature dataset.
Figure 9:
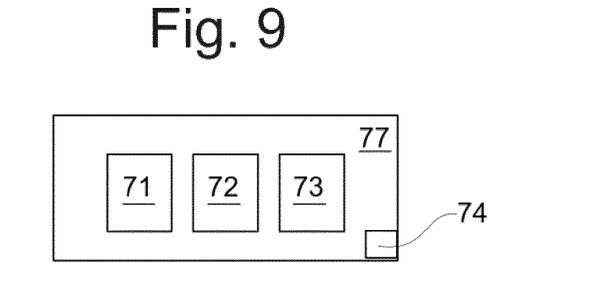
FIG. 9 schematically illustrates a block related to a still further example of a signature dataset.

Although the following examples are related to a signature dataset 7, 70, 77 it may be understood that a signature mathematical representation has been computed on the basis of such exemplary signature dataset 7, 70, 77.

Figure 1:
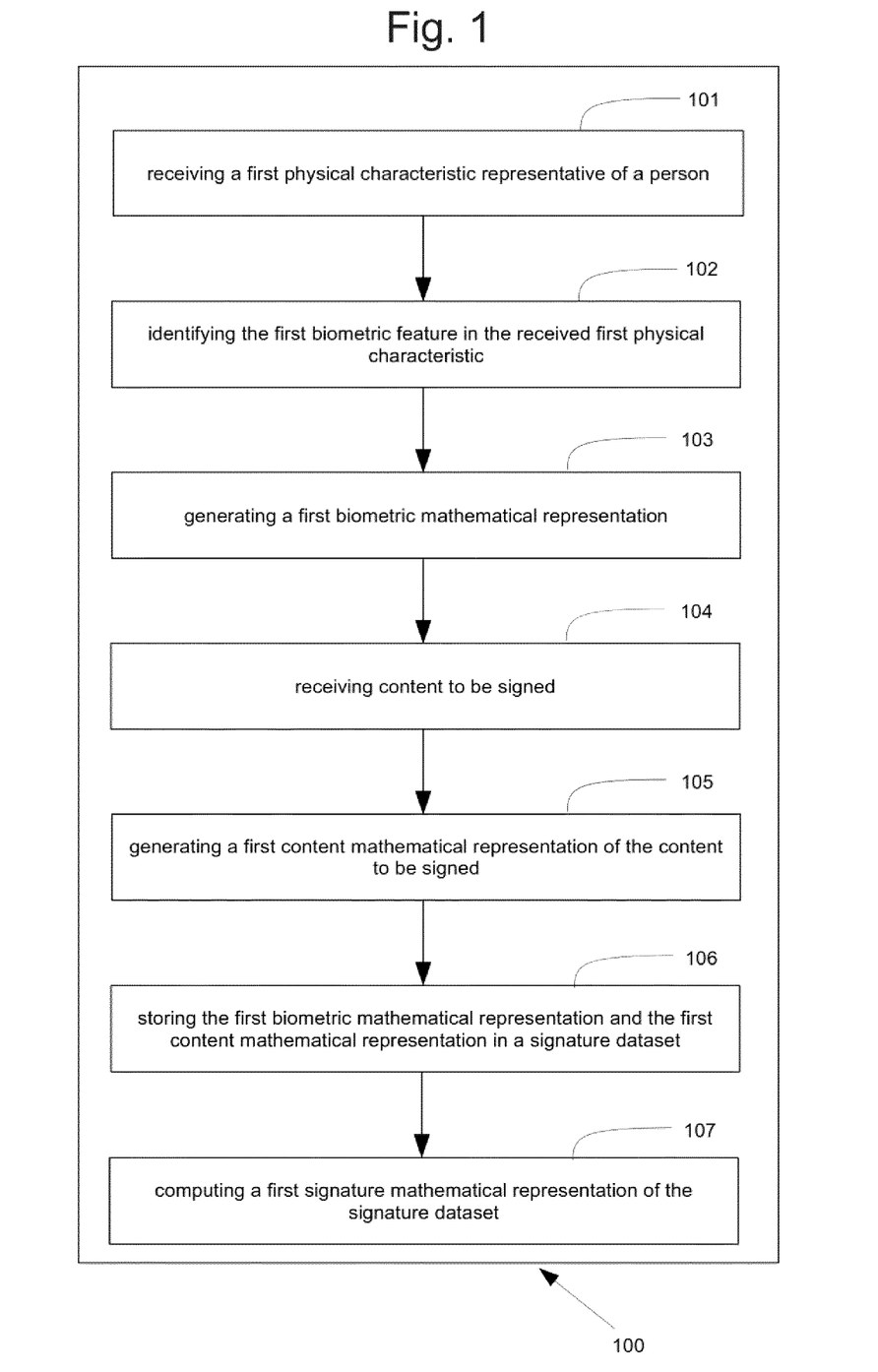
FIG. 1 is a flow chart of a method for generating an electronic signature, according to an example.

FIG. 1 shows a flow chart of a method for generating an electronic signature, according to an example, and FIG. 7 schematically illustrates a block related to an example of a signature dataset 7. The signature dataset 7 may be generated through the implementation of method 100. As seen in FIG. 1, the method for generating an electronic signature 100 comprises:

receiving 101 one or more first physical characteristics representative of a person. The first physical characteristic contains a first biometric feature of the person which is intended to sign. Details about the physical characteristics may be provided later on;

identifying 102 the first biometric feature in the received first physical characteristic;

generating 103 a first biometric mathematical representation representing the first biometric feature of the person;

receiving 104 a content to be signed. The content to be signed may be received as data (or content data) in any suitable format;

generating 105 a first content mathematical representation representing the content to be signed. A hash value, i.e. through mathematical function, of the content may be generated/computed on the basis of the data related to the content to be signed, e.g. digital content data. The hash function applied in the present disclosure may be chosen from those available in the art;

storing 106 the first biometric mathematical representation 71 and the first content mathematical representation 72 in a signature dataset 7;

computing 107 a first signature mathematical representation of the signature dataset 7.

Figure 5:
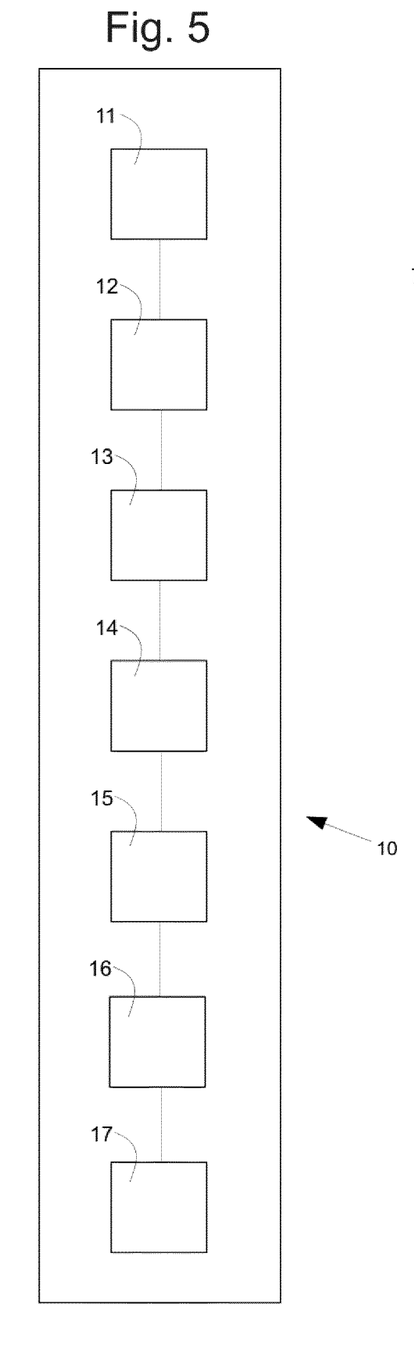
FIG. 5 schematically illustrates a system for generating an electronic signature, according to an example.
Figure 6:
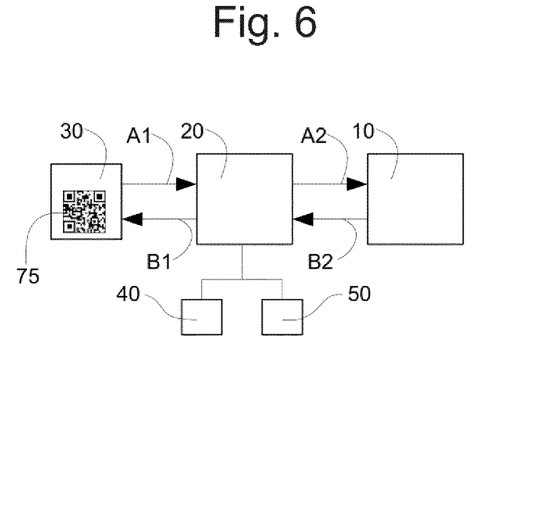
FIG. 6 schematically illustrates an example of arrangement of devices involved in an electronic signature process.

Details of the method for generating an electronic signature 100 and a system for generating an electronic signature 10 will be explained in an example of operation. Regarding the system 10, it can be shown in FIGS. 5 and 6. Particularly, FIG. 5 schematically illustrates a system for generating an electronic signature 10, according to an example and FIG. 6 schematically illustrates an example of arrangement of devices involved in an electronic signature process. System 10 may be configured/adapted to perform any of the herein disclosed methods.

In some examples, the content to be signed or a content already signed may further comprise one or more of a date, a title, number of pages, a contract number, etc. related to the (sensitive) operation. Therefore, certain relevant information of the content to be signed may be included in the electronic signature.

An aim of computing the first signature mathematical representation may be that if someone modifies the electronic signature, the new calculated second signature mathematical representation will not match the authentic first signature mathematical representation. The first signature mathematical representation may be a unique string identifying the signature dataset. This way, if someone modifies the content to be signed (for example, changes the value of the loan granted), the second content mathematical representation (of the content) would be different from the stored first content mathematical representation and, therefore, the second signature mathematical representation would be different from the stored first signature mathematical representation. The first content mathematical representation may be linked to the idea of ensuring the integrity of the signature and its linkage to the signed content in such a way that any subsequent change may be detectable. The first signature mathematical representation may uniquely link the first content mathematical representation and the first biometric mathematical representation, so that if someone were to modify the signature dataset by altering such a link between the signatory and the content to be signed, the new second signature mathematical representation would be different from the stored first signature mathematical representation.

The method for generating an electronic signature 100 may further comprise authenticating the identity of the person intended to sign. The authentication of the person intended to sign may be carried out exemplarily before receiving the first physical characteristic. However, the authentication may be implemented after receiving the first physical characteristic and before storing the first biometric mathematical representation 71 and the first content mathematical representation 72 in the signature dataset 70 as well. In both cases, the authentication may be performed by the system 10.

Authenticating the identity of the person intended to sign is an optional feature of the method 100, because it may be carried out in different ways. For example, it can be done in a "human" way (e.g. notary checking the ID card visually), or automatically. The authentication of the identity may ensure that the identity of the person signing is guaranteed prior to the signature.

According to an example of the method 100, authenticating the identity of the person intended to sign may comprise authenticating an ID document of the person to be authenticated. The ID document may be an identity card, driving license, credit, debit, business, medical, insurance card, passport, tickets, etc. or any other documentation able to be used for identifying at least one person or being used in transactions such as bank notes, cheques, etc. or the like.

In an example of the method 100, authenticating the identity of the person intended to sign may comprise obtaining a first image of the face of the person to be authenticated (intended to sign) and determining a first matching score by comparing a second image printed on the ID document with the face presented in the obtained first image. The second image from the ID document may be taken substantially at the same time as the first image or may be taken before, e.g. stored in a memory or database 40 available to the system 10. If the first matching score satisfies a predefined requirement such as a predefined first threshold, the identity of the person may be authenticated.

According to some examples of the method 100, authenticating the identity of a person intended to sign may comprise: obtaining a first video of the face of the person to be authenticated (intended to sign) and determining a second matching score by comparing a second image printed on the ID document with the face presented in the obtained first video. As above mentioned, the second image may be taken at substantially the same time as the first video or may be taken before. If the second matching score satisfies a predefined requirement such as a predefined second threshold, the identity of the person may be authenticated.

In some examples, the method for generating an electronic signature may further comprise obtaining a second video of the face of the person to be authenticated and determining a third matching score by comparing the face presented in the obtained first image with the face presented in the obtained second video. Both second and third videos may be produced at substantially the same time or a different time. If the third matching score satisfies a predefined requirement such as a predefined third threshold, the identity of the person may be authenticated.

The feature receiving 101 one or more first physical characteristics representative of a person may comprise capturing a physical characteristic representative of the person, the physical characteristic containing the biometric feature of the person.

According to some examples, capturing a physical characteristic may comprise automatically capturing the physical characteristic. The physical characteristic may be intentionally captured by the person intended to sign, by the person whose identity is to be authenticated or even by the counterpart to the person i.e. a bank, a company, a government or the like.

The physical characteristic representative of the person may be captured in a controlled location. This may mean that the capture is held in a particular place previously predefined. If the capture is not performed in such predefined place, the capture could not be allowed. In an example, if the capture is performed with an electronic device 30 with a positioning system, the device 30 may take advantage of satellites, antennas, probes, beacons, IP geolocation or the like to determine whether the place of capture is located inside an allowed area. In a further example, the device 30 may be positioned in an authorized/supervised location, so no further references may be required to allow the operation. This way the site where the signature is generated may be controlled. For example, it may be possible to control if the signature dataset is done in a specific notary's office, bank, court, country and not others. So that the generation of electronic signatures in uncontrolled places may be avoided and there may be also traceability of the place where the electronic signature was generated. This may be an additional security and control measure compared to prior art solutions.

Capturing a physical characteristic representative of the person may exemplarily comprise capturing one or more of an image, an audio, a video, a biological, or a chemical sample of the person. In the case of an image, capturing the image may exemplarily comprise capturing a third image with one or more of a portion of a face, of a palm, of a fingerprint, of an eye, of ears, of a nose, of teeth, of a tongue, of palm veins pattern, or of finger veins pattern, of the person. In the case of an audio, capturing the audio may exemplarily comprise capturing a voice sample of the subject.

The first biometric mathematical representation may be generated based on a second image or data from an ID document (stored in the ID document). This way, no picture of the person has to be taken from the face or any other part of the body. Thus, the method 100 may be implemented even if it is not possible to take a picture from the person intended to sign.

The method 100 may further comprise receiving contextual data 73 and storing the contextual data 73 in the signature dataset 70. The contextual data 73 may be stored in the signature dataset 70 along with the first biometric mathematical representation 71 and the first content mathematical representation 72. FIG. 8 schematically illustrates a block related to a further example of the signature dataset 70 with the contextual data 73. The example of signature dataset 70 of FIG. 8 may be obtained by the method 100 as well.

Contextual data 73 may be related to the content to be signed. Receiving contextual data 73 may exemplarily comprise receiving data related to one or more of a date of the signature, location, information of a device or connection of a device. Contextual data may further comprise any data not related to the content to be signed such as additional information that the signatory may want to store.

The signature dataset (and so the first signature mathematical representation) may be an encrypted signature dataset. Thus, the transmission of the signature mathematical representation of the signature dataset may be safer. The encryption may be performed following any suitable procedure available in the art. FIG. 9 schematically illustrates a block related to a still further example of a signature dataset 77. Signature dataset 77 is an example of encrypted signature dataset 77 and block 74 is used to depict encryption. Signature dataset 77 (and so the first signature mathematical representation) may be also produced through the method 100 when the signature dataset is encrypted.

The method 100 may further comprise storing the signature dataset in a physical medium or electronic device. The physical medium and the electronic device may be examples of a supporting medium 76. The physical medium may be a paper document or the like. The electronic device may be the client's device 30 used by the signatory to store the signature mathematical representation. The electronic device may be also a server or the like where the signature mathematical representation may be stored in an electronic format regardless a copy of the signature mathematical representation may be delivered to the signatory and the signatory stores the copy of the signature mathematical representation in their own device.

Furthermore, the method 100 may further comprise obtaining the signature mathematical representation (and so the signature dataset) from the electronic device through a wireless protocol. The wireless protocol may comprise Bluetooth, Wi-Fi, NFC (Near Field Communication) and so on. This may mean that the electronic signature delivered to the signatory may be emitted from the electronic device 30 of the signatory using wireless technology. The electronic device may be also a chip with communication capabilities, so that the signature dataset may be obtained from the electronic device through the above-mentioned wireless protocol. This feature could be useful if the signatory needs to recover the electronic signature in order to make frequent transactions from his or her electronic device.

Figure 10:
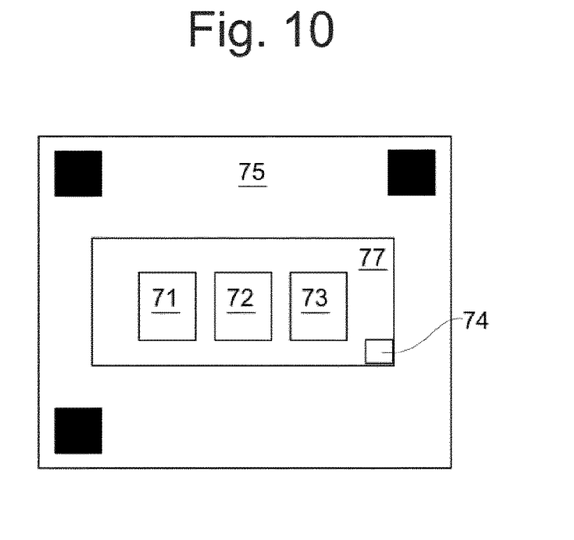
FIG. 10 schematically illustrates a block related to an example of a machine-readable optical label comprising the example of signature dataset of FIG. 9.
Figure 11:
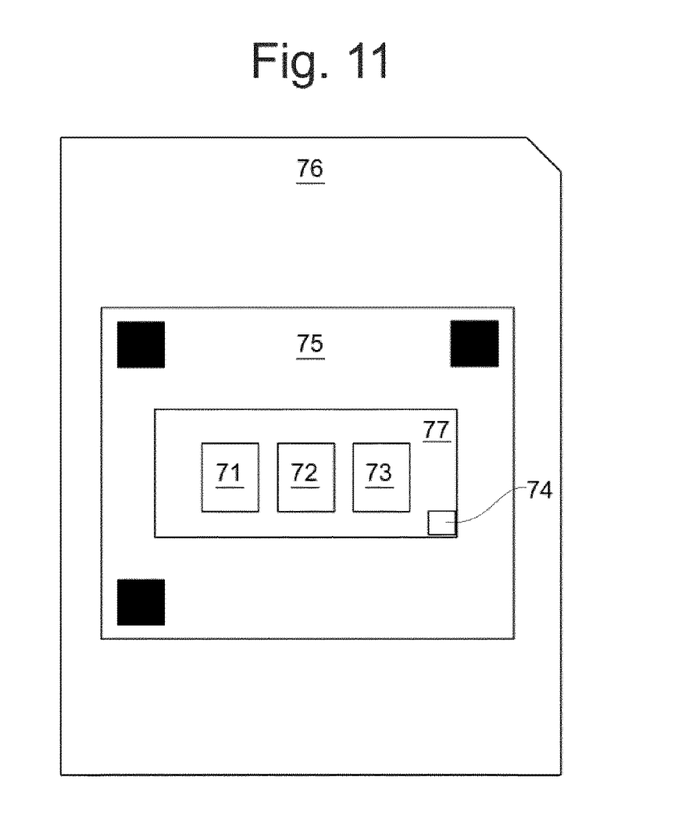
FIG. 11 schematically illustrates a block related to an example of supporting medium for supporting a content to be signed having the machine-readable optical label of FIG. 10.

In some examples, storing the signature dataset may comprise generating a machine-readable optical label 75 that carries the signature mathematical representation and providing the machine-readable optical label 75 to the supporting medium 76 such as physical or digital/electronic type. The machine-readable optical label 75 may be used as an electronic signature. The supporting medium 76 may refer to the physical or digital support for the content to be signed or already signed, e.g. a contract or an agreement in an electronic file or a piece of paper as above mentioned. This signature dataset may be sent to the customer in the form of the machine-readable optical label 75.

FIG. 10 schematically illustrates a block related to an example of a machine-readable optical label 75 comprising the example of signature dataset 77 of FIG. 9. FIG. 11 schematically illustrates a block related to an example of a supporting medium 76 having the machine-readable optical label 75 of FIG. 10. Although FIGS. 10 and 11 have been illustrated referred to the example of signature dataset 77, the machine-readable optical label 75 may be implemented along with any of herein disclosed examples of signature dataset 7, 70, 77.

Particularly, generating the machine-readable optical label 75 may comprise generating a two-dimensional barcode. And more particularly, generating a two-dimensional barcode may comprise generating a quick-response code. The two-dimensional barcode may further comprise a barcode.

The method for generating an electronic signature may further comprise inserting the machine-readable optical label 75 in the content to be signed. For instance, the label 75 may be embedded into that content.

The method for generating an electronic signature 100 may further comprise receiving a time stamp of the signature dataset or the first signature mathematical representation. This may be done after the first content mathematical representation and the biometric mathematical representation being stored together.

Generating 103 a first biometric mathematical representation may comprise automatically generating the biometric mathematical representation using a biometric engine. The biometric engine may be implemented in a processor of the system 10.

The biometric engine may receive a digital representation of the physical characteristic captured (e.g. in the form of a file) and extract the biometric feature(s) from the digital representation.

The biometric engine may provide a biometric mathematical representation using different automatic means. In particular, machine learning techniques may be implemented. The biometric mathematical representation may be produced following these steps:
1. Biometric target location: using a model of the biometric target (e.g., voice or face) a location of the object is computed over the biometric captured data.
   a. In voice biometrics, the target is to locate sequences of recorded signal where human voice is detected.
   b. In image-based biometrics, it is computed a bounding box where the target object is located.
2. Normalization: the biometric data is extracted from the rest of the data and normalized to reduce object variance.
3. Embedding computation: Mathematical processes are applied to obtain simplified representations of the normalized object (the so-called embeddings). This process can be done through:
   a. Deep neural networks (DNN), in the form of convolutional neural networks, can be used for face and voice, which commonly provide 128 components-length embedding vectors.
   b. Other dimensionality reduction processes that can be adjusted to convert iris, fingerprints, or other biometrics data into an embedding vector or matrix.

The biometric engine may be implemented as an end-to-end biometric engine system, in such a way each of the steps enumerated above are not explicitly programmed but learned from examples using machine learning techniques. Operating as an end-to-end system may require specifying a model structure which allows the execution of steps 1, 2 and 3, but the programmer may not need to code explicitly what needs to be done at each step.

The biometric engine may be running on the same system 10 or it may reside in an external or remote server or in a cloud server. The biometric engine may generate a feature vector or matrix representing the biometric feature.

A version of the biometric engine may also be included in the biometric mathematical representation. The version of the biometric engine may be useful for performing a comparison of two biometric mathematical representation with each other.

The biometric mathematical representation may be optionally encrypted using encryption modules or devices (not illustrated) to increase the security of the biometric data, it is possible to encrypt the feature mathematical representation using a symmetric or asymmetric algorithm, which can use the person's data to generate a particular encryption key.

In some examples, a first biometric mathematical representation may be generated for each person of a group of people, and multiple first biometric mathematical representations may be stored in the signature dataset along with the first content mathematical representation, such as a first hash value.

The above-mentioned group of people may be a couple, a family, etc. or may belong to the same organization, company, etc.

The signature dataset 7, 70, 77 and so the first signature mathematical representation may be exemplarily an electronic signature.

Figure 2:
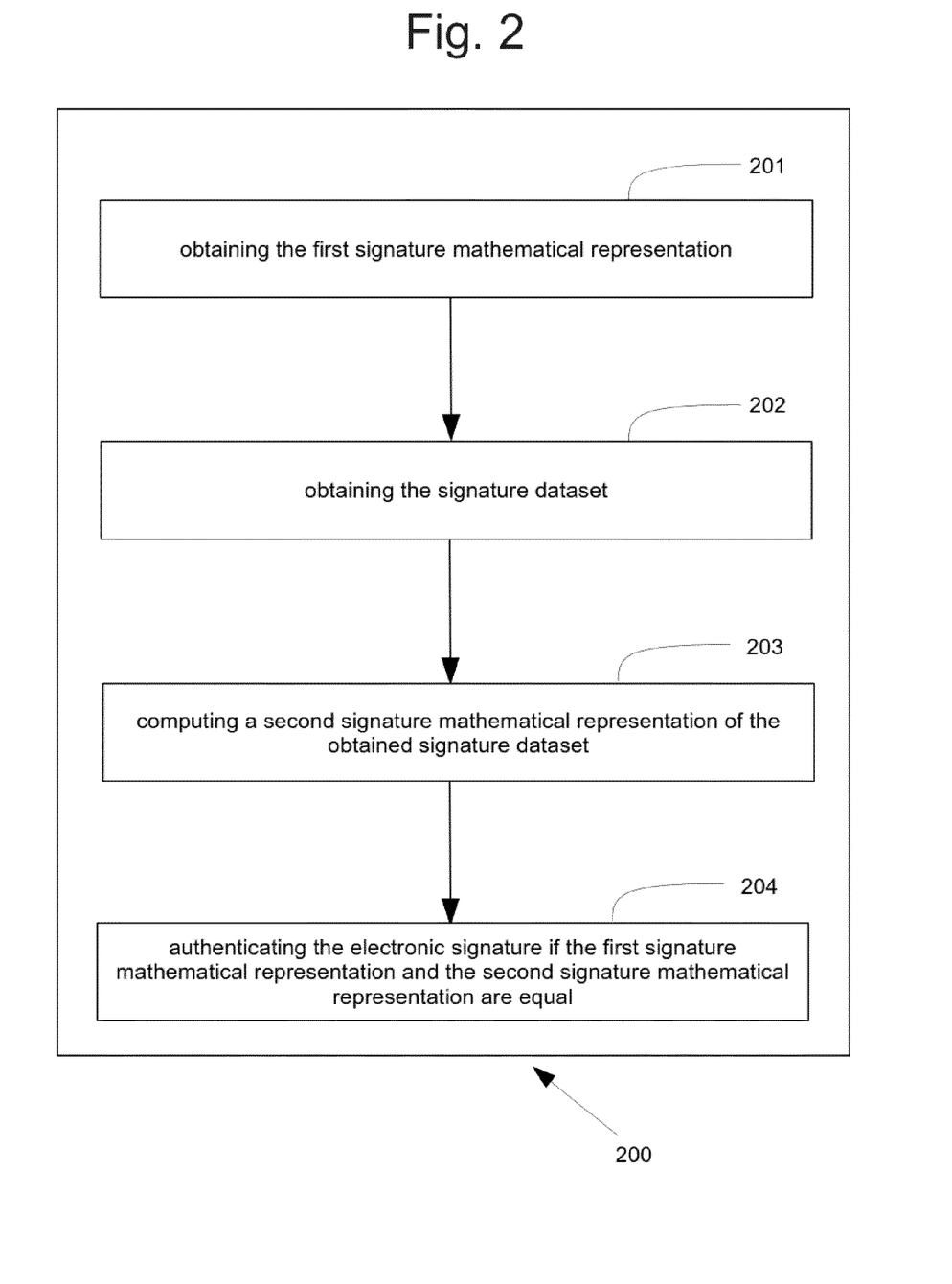
FIG. 2 is a flow chart of a method for authenticating an electronic signature, according to an example.

FIG. 2 is a flow chart of a method for authenticating an electronic signature 200, according to an example. The method for authenticating the electronic signature generated by the method 100 when a first signature mathematical representation of the signature dataset has been generated, may comprise:
  obtaining 201 the first signature mathematical representation of the signature dataset 7, 70, 77;
  obtaining 202 the signature dataset;
  computing 203 a second signature mathematical representation of the obtained signature dataset;
  authenticating 204 the electronic signature if the first signature mathematical representation and the second signature mathematical representation are equal. Details about this method 200 may be provided later on in connection with an example of operation.

Figure 3:
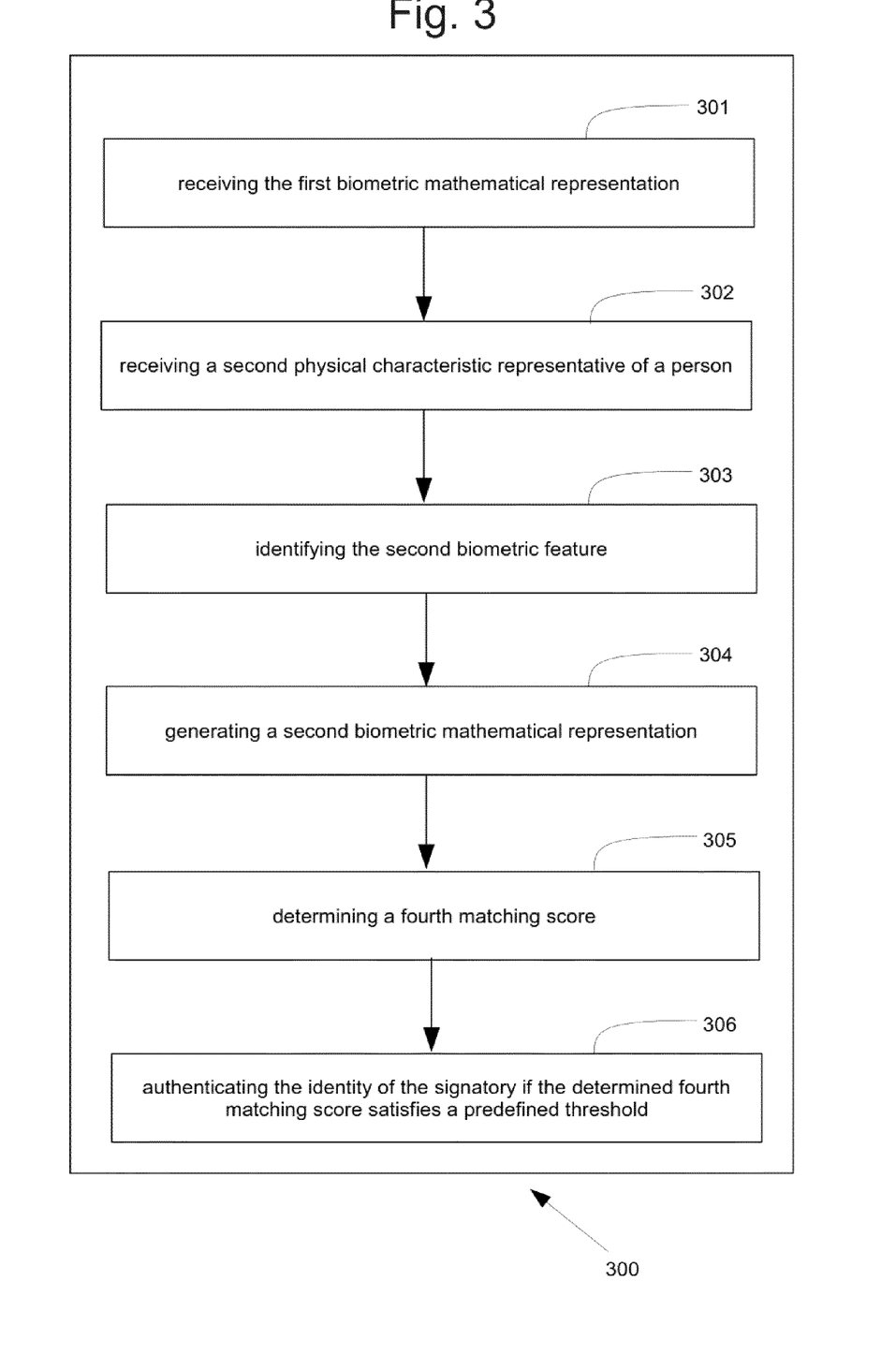
FIG. 3 is a flow chart of a method for authenticating an identity of the signatory, according to an example.

FIG. 3 is a flow chart of a method for authenticating an identity of the signatory 300, according to an example. The method for authenticating the identity of the signatory 300 who signed the electronic signature generated by the corresponding herein disclosed methods, may comprise:
  receiving 301 the first biometric mathematical representation stored on the signature dataset,
  receiving 302 a second physical characteristic representative of a person, the second physical characteristic containing a second biometric feature of the person;
  identifying 303 the second biometric feature in the received second physical characteristic;
  generating 304 a second biometric mathematical representation representing the identified second biometric feature;
  determining 305 a fourth matching score by comparing the first biometric mathematical representation and the second biometric mathematical representation;
  authenticating 306 the identity of the signatory if the determined fourth matching score satisfies a predefined threshold. Details about this method 300 may be provided later on in connection with an example of operation.

The authentication of the identity of the person intended to sign and the authentication of the identity of the signatory may be carried out in a complementary way and are not incompatible with each other. In fact, authentication of the identity of the person intended to sign may be carried out before the signature generation and the authentication of the identity of the signatory may be carried out after the signature generation (authentication of the person who signed).

When the fourth matching score satisfies the predefined threshold, the method for authenticating an identity of the signatory 300 may further comprise authorizing access to full content of the data stored on the electronic signature or signature dataset, or to full content of the signed content. This may be the case, for instance, of the actual signatory who may want to know all the data stored on the signature dataset, or an expert witness in a legal proceeding that may require this information. The expert witness may use it to prove a person's signature correspondence.

When the fourth matching score does not satisfy the predefined threshold, the method for authenticating an identity of the signatory may further comprise authorizing access to partial content of the data stored on the electronic signature or to partial content of the signed content. This may be the case, for instance, of the counterpart to the customer. For instance, the counterpart cannot know sensitive data related to the signatory or vice versa.

If the fourth matching does not satisfy the predefined threshold, access to any content in the signature dataset may be denied.

According to some examples, when the signature dataset comprises multiple first biometric mathematical representations of the group of people, the identity of the signatory may be authenticated if the fourth matching score related to at least one person satisfies the predefined threshold. For example, an organization in which there are several partners and they all have powers to make financial transactions.

According to some examples, when the signature dataset comprises multiple first biometric mathematical representations of the group of people, the identity of the signatory may be authenticated if the fourth matching score of each person of the group satisfies the predefined threshold. For example, a married couple that owns 50% (each one) of a house. The signature of both of them may be required to make a transaction on the property.

Figure 4:
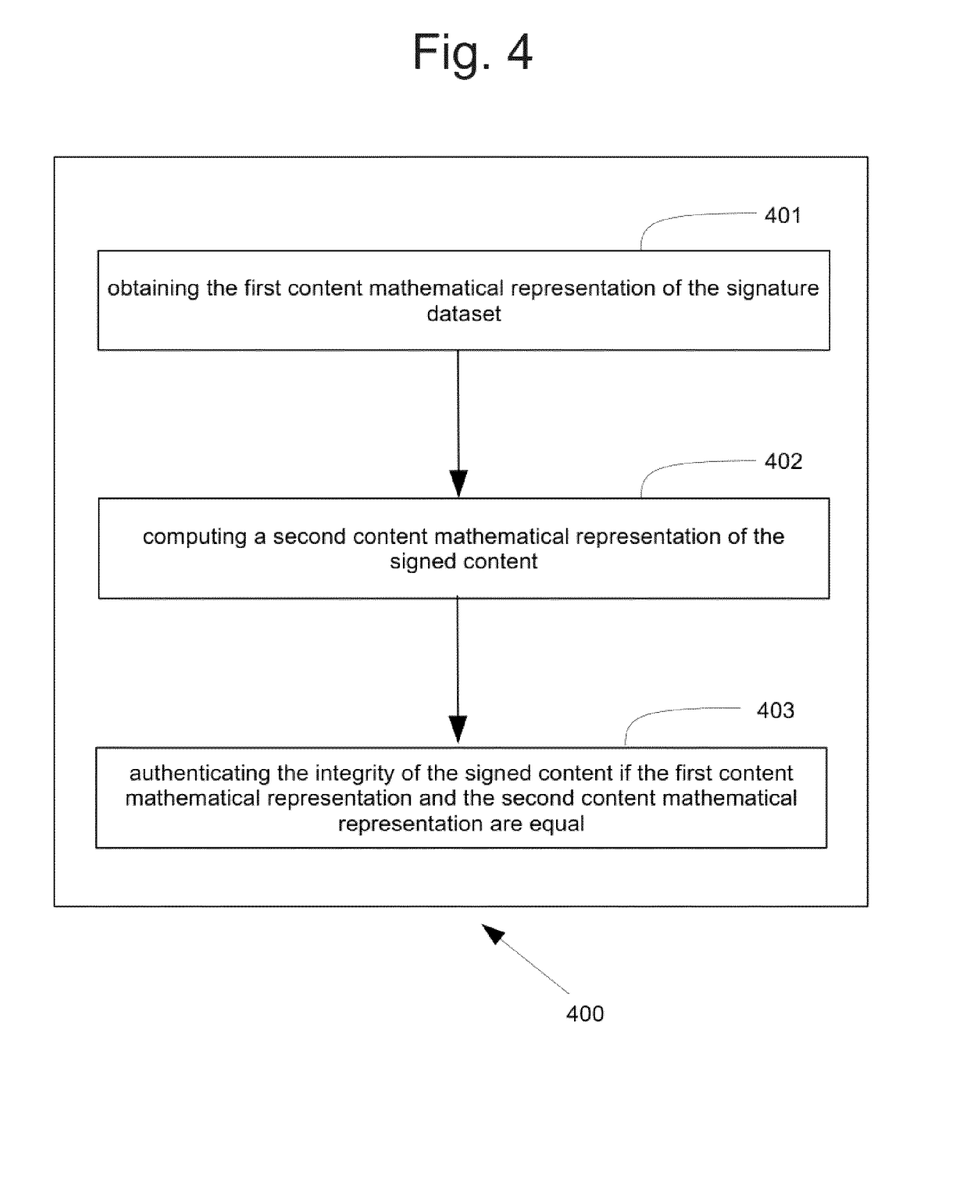
FIG. 4 is a flow chart of a method for authenticating the integrity of a content signed, according to an example.

FIG. 4 is a flow chart of a method for authenticating the integrity of a signed content 400 that has been signed with an electronic signature generated by any of herein disclosed examples of method 100. The method for authenticating the integrity of a signed content comprising:
    obtaining 401 the first content mathematical representation stored in the signature dataset;
    computing 402 a second content mathematical representation of the signed content. The signed content may be formed as data in any suitable format, so the second content mathematical representation may be obtained on the basis of the data related to the signed content. If no fraud has been committed, the signed content after generating the electronic signature should be the same as the content to be signed before generating the electronic signature;
    authenticating 403 the integrity of the signed content if the first content mathematical representation and the second content mathematical representation are equal.

At least one of the methods 100, 200, 300, 400 may further comprise performing spoofing and/or proof-of-life detection when generating the first and/or second biometric mathematical representation. This may involve reducing the risk of fraud when performing a sensitive online operation.

It can be seen in FIG. 5 that the system for generating an electronic signature 10 comprises:
    a characteristic receiving module 11 configured to receive at least one first physical characteristic representative of a person. The first physical characteristic contains a first biometric feature of the person;
    an identifying module 12 configured to identify the first biometric feature in the received physical characteristic;
    a biometric generating module 13 configured to generate a first biometric mathematical representation representing the first biometric feature of the person;
    a content receiving module 14 configured to receive a content to be signed;
    a content generating module 15 is configured to generate a first content mathematical representation of the content to be signed. As herein disclosed, the mathematical representation may be produced on the basis of data related to the content to be signed;
    a storing module 16 configured to store the first biometric mathematical representation and the first content mathematical representation in a signature dataset;
    a computing module 17 configured to compute a first signature mathematical representation of the signature dataset.

The system 10 may be embodied as computing system e.g. physical computer or cloud-computing or as an on-premises software.

According to an aspect, a non-transitory computer program product that causes a processor to generate an electronic signature, is disclosed. The non-transitory computer program product has instructions to:
    receive one or more first physical characteristics representative of the person.
    The first physical characteristic contains a first biometric feature of the person which is intended to sign;
    identify the first biometric feature in the received first physical characteristic;
    generate a first biometric mathematical representation representing the first biometric feature of the person;
    receive content to be signed;
    generate a first content mathematical representation of the content to be signed;
    store the first biometric mathematical representation and the first content mathematical representation in a signature dataset;
    compute a first signature mathematical representation of the signature dataset.

According to an aspect, a computer program product comprising program instructions for causing a computing system to perform a method according to any of herein disclosed methods is disclosed. The computer program product may be embodied on a storage medium or may be carried on a carrier signal.

An example of implementation of the method for generating an electronic signature 100 will set forth in the following in connection with FIG. 6.

As shown in FIGS. 5 and 6, the system for generating an electronic signature 10 that may be exemplarily implemented as a computing device comprising a memory and a processor, embodying instructions stored in the memory and executable by the processor. The instructions may comprise functionality to execute the method for generating an electronic signature 100 according to any of herein disclosed examples. The system 10 may be the same as above depicted so no further details may be provided.

The system 10 may be connected directly or wirelessly with a middleware client 20 and the middleware client 20 may be connected directly or wirelessly with a client's electronic device 30, e.g. an electronic portable device.

Middleware client 20 may be for instance a bank or the like which may take advantage of the system for generating an electronic signature 10 for the final client or customer. The middleware client 20 may be also in data communication with a database 40 of clients and a time stamping unit 50. The database 40 may comprise a list of ID documents of the clients.

Device 30 may be operated by a user, a final client, a person intended to sign or signatory. The client's device 30 may be an example of a capturing device that may be capable of capturing a physical characteristic representative of the person and may be also capable of data communication with the computing device according to any of herein disclosed examples. In some other examples, the device 30 may belong to an entity (i.e. a bank) and the client may be asked to look at the camera and perform the actions indicated on the screen.

Examples of tools for capturing physical characteristics representative of the person may be a microphone or a camera. Client's device 30 may act as platform to run a software development kit (SDK). The SDK may be a user's interface.

The data communication of device 30 with the computing device may be directly implemented or implemented through the middleware or gateway. Although the middleware client 20 has been illustrated in data communication with the portable device 30 and system 10, in other non-illustrated examples, the computing device of the system 10 may be in data communication with the portable device 30 without the middleware client 20.

In some examples, the system 10 and the device 30 may be implemented in the same apparatus, i.e. integrally formed.

In FIG. 6, a first communication from the device 30 to the middleware 20 has been illustrated with the reference number A1. A second communication A2 from the middleware 20 to the system 10, a third communication B2 from the system 10 to the middleware 20 and a fourth communication B1 from the middleware 20 to the device 30 have been also illustrated. Communications A1, B1 may be implemented as a single channel for both directions, i.e. from and towards the device 30 or each communication may have its own channel. The same may apply to communications A2, B2 towards and from the system 10 mutatis mutandis. Communications A1, A2, B1, B2 may be encrypted and may transmitted through secure channels.

Although FIG. 5 illustrates the middleware 20 and the device 30, the herein disclosed methods may be exemplary implemented through the system 10 without the middleware 20 and the device 30.

In an exemplary operating case, the system 10 may receive the first physical characteristic of the person, e.g. a selfie taken through the device 30 or voice sensed by a microphone or the like through the device 30. The first biometric feature may be identified by the identifying module 12 in the received first physical characteristic by the characteristic receiving module 11.

The first biometric mathematical representation, i.e. the biometric vector or matrix may be generated by the generating module 13. Furthermore, the content to be signed as herein disclosed may be also received by the dedicated content receiving module 14 of the system. The first content mathematical representation may be generated by means of the content generating module 15.

The first biometric mathematical representation and the first content mathematical representation may be stored in a signature dataset through the storing module 16. The first signature mathematical representation of the signature dataset may be computed by the computing module 17.

The machine-readable optical label 75 may be generated by a processor of the system 10, for instance as a QR code, and the machine-readable optical label 75 may be sent through communications B2, B1 to the electronic device 30. In this case the machine-readable optical label 75 may be embedded in an electronic document as a contract or agreement that may be displayed by the device 30. The electronic document may be an example of medium 76. The time stamping may be applied to the signature dataset before being delivered to the client.

In the following an example of method 200 will be explained in conjunction with system 10 and device 30.

The electronic signature may be authenticated, for instance, by the system 10. The already generated optical label 75 may be received by the system 10 from the electronic device 30 directly or through the middleware 20. The system 10 may obtain the first signature mathematical representation and may obtain the signature dataset. A second signature mathematical representation may be computed by the system 10 upon the obtained signature dataset.

The electronic signature may be authenticated if the obtained first signature mathematical representation and the computed second signature mathematical representation are equal/the same. Otherwise, the electronic signature may not be authenticated.

In the following an example of method 300 will be explained in conjunction with system 10, middleware 20 and device 30.

The identity of the signatory may be authenticated, for instance by the system 10. The system 10 may receive the first biometric mathematical representation stored on the signature dataset. The signature dataset may be sent from the device 30 directly or through the middleware 20. The second physical characteristic containing a second biometric feature of the signatory (person) may be received and even produced in a similar way than the first physical characteristic, so no further details will be provided. The second biometric feature may be identified by the system 10 in the received second physical characteristic. The second biometric mathematical representation may be generated by the system 10. A comparison between the first biometric mathematical representation and the second biometric mathematical representation may be performed by the system 10 to determine the fourth matching score. The identity of the person may be authenticated if the determined fourth matching score satisfies a predefined threshold.

In the following an example of method 400 will be explained in conjunction with system 10 and device 30.

The integrity of the signed content may be authenticated, for instance, by the system 10. The already generated optical label 75 may be received by the system 10 from the electronic device 30 directly or through the middleware 20. The system 10 may obtain the first content mathematical representation from the received optical label 75. A second content mathematical representation may be computed by the system 10 upon the obtained signed content. The integrity of the signed content may be authenticated if the obtained first content mathematical representation and the computed second content mathematical representation are equal/the same. Otherwise, the electronic signature may not be authenticated.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

Further, although the examples described with reference to the drawings comprise computing apparatus/systems and processes performed in computing apparatus/systems, the invention also extends to computer programs, particularly computer programs on or in a carrier, adapted for putting the system into practice.

The invention claimed is:

1. A method for generating an electronic signature comprising:
   receiving at least one first physical characteristic representative of a person, the first physical characteristic containing a first biometric feature of the person;
   identifying the first biometric feature in the received first physical characteristic;

generating a first biometric mathematical representation representing the first biometric feature of the person;

receiving a content to be signed;

generating a first content mathematical representation representing the content to be signed;

storing the first biometric mathematical representation and the first content mathematical representation in a signature dataset;

computing a first signature mathematical representation of the signature dataset;

authenticating the signature dataset, comprising:
obtaining the first signature mathematical representation of the signature dataset;
obtaining the signature dataset;
computing a second signature mathematical representation of the obtained signature dataset; and the method further comprising, responsive to the first signature mathematical representation and the second signature mathematical representation being equal, authenticating the electronic signature.

2. The method according to claim 1, further comprising authenticating the identity of the person intended to sign.

3. The method according to claim 2, wherein authenticating the identity of the person intended to sign comprises:
authenticating an ID document of the person to be authenticated.

4. The method according to claim 3, wherein authenticating the identity of the person intended to sign further comprises:
obtaining a first image of the face of the person to be authenticated;
determining a first matching score by comparing a second image printed on the ID document with the face presented in the obtained first image, and
responsive to the determined first matching score satisfying a predefined first threshold, authenticating the identity of the person.

5. The method according to claim 1, wherein receiving at least one first physical characteristic representative of a person comprises:
capturing a physical characteristic representative of the person, the physical characteristic containing the biometric feature of the person.

6. The method according to claim 5, wherein capturing a physical characteristic representative of the person comprises capturing one or more of an image, an audio, a video, a biological, or a chemical sample of the person.

7. The method according to claim 1, wherein the first biometric mathematical representation is generated based on a second image or data from an ID document.

8. The method according to claim 1, further comprising:
storing the signature dataset in a physical medium or electronic device.

9. The method according to claim 8, wherein storing the signature dataset comprises:
generating a machine-readable optical label that carries the signature dataset;
providing the machine-readable optical label to the physical medium or electronic device.

10. The method according to claim 9, further comprising:
inserting the machine-readable optical label in the content to be signed.

11. The method according to claim 1, wherein generating a first biometric mathematical representation comprises automatically generating the biometric mathematical representation using a biometric engine.

12. The method according to claim 1, wherein a first biometric mathematical representation is generated for each person of a group of people, and multiple first biometric mathematical representations are stored in the signature dataset along with the first content mathematical representation.

13. The method according to claim 1, wherein the signature dataset is an electronic signature.

14. The method according to claim 1, further comprising:
authenticating an integrity of a signed content signed with the signature, comprising:
obtaining the first content mathematical representation stored in the signature dataset;
computing a second content mathematical representation of the signed content; and
responsive to the first content mathematical representation and the second content mathematical representation being equal, authenticating the integrity of the signed content.

15. The method according to claim 1, further comprising:
performing spoofing and/or proof-of-life detection when generating the first and/or second biometric mathematical representation.

16. A method for authenticating an identity of a signatory who signed an electronic signature generated by a method for generating an electronic signature comprising:
receiving at least one first physical characteristic representative of a person, the first physical characteristic containing a first biometric feature of the person;
identifying the first biometric feature in the received first physical characteristic;
generating a first biometric mathematical representation representing the first biometric feature of the person;
receiving a content to be signed;
generating a first content mathematical representation representing the content to be signed;
storing the first biometric mathematical representation and the first content mathematical representation in a signature dataset;
computing a first signature mathematical representation of the signature dataset;
authenticating the signature dataset, comprising:
obtaining the first signature mathematical representation of the signature dataset;
obtaining the signature dataset;
computing a second signature mathematical representation of the obtained signature dataset; and
the method further comprising, responsive to the first signature mathematical representation and the second signature mathematical representation being equal, authenticating the electronic signature;
wherein the method for authenticating the identity of the signatory comprises:
receiving the first biometric mathematical representation stored on the signature dataset;
receiving a second physical characteristic representative of a person, the second physical characteristic containing a second biometric feature of the person;
identifying the second biometric feature in the received second physical characteristic;
generating a second biometric mathematical representation representing the identified second biometric feature;
determining a matching score by comparing the first biometric mathematical representation and the second biometric mathematical representation;

authenticating the identity of the signatory if the determined matching score satisfies a predefined threshold.

17. The method according to claim 16, further comprising authorizing access to, at least, partial content of the data stored on the signature data or to, at least, partial content of the signed content.

18. The method according to claim 16, wherein when the signature dataset comprises multiple first biometric mathematical representations of the group of people, the identity of the signatory is authenticated if the fourth matching score related to at least one person satisfies the predefined threshold.

19. A system for generating an electronic signature comprising:
   a characteristic receiving module configured to receive at least one first physical characteristic representative of a person, the first physical characteristic containing a first biometric feature of the person;
   an identifying module configured to identify the first biometric feature in the received physical characteristic;
   a biometric generating module configured to generate a first biometric mathematical representation representing the first biometric feature of the person;
   a content receiving module configured to receive a content to be signed;
   a content generating module configured to generate a first content mathematical representation of the content to be signed;
   a storing module configured to store the first biometric mathematical representation and the first content mathematical representation in a signature dataset;
   a computing module configured to compute a first signature mathematical representation of the signature dataset, wherein the computing module further computes a second signature mathematical representation of the signature dataset and, responsive to the first signature mathematical representation and the second mathematical representation being equal, authenticating the electronic signature.

* * * * *